United States Patent [19]

Sullins

[11] 4,092,105
[45] May 30, 1978

[54] METHOD OF RECOVERING OXIDIZED DYE FROM DYE WASH WATER

[75] Inventor: John K. Sullins, Kingsport, Tenn.

[73] Assignee: Canton Textile Mills, Inc., Canton, Ga.

[21] Appl. No.: 770,219

[22] Filed: Feb. 18, 1977

Related U.S. Application Data

[63] Continuation-in-part of Ser. No. 639,840, Dec. 11, 1975, abandoned.

[51] Int. Cl.$^2$ .......................... C09B 7/00; D06P 5/00; B01D 15/06
[52] U.S. Cl. .............................................. 8/81; 8/80; 210/42 R; 210/44; 210/60
[58] Field of Search .................. 8/81, 80; 210/60, 44, 210/42 R

[56] References Cited

U.S. PATENT DOCUMENTS

| | | | |
|---|---|---|---|
| 1,303,426 | 5/1919 | Wall | 8/81 |
| 2,242,139 | 5/1941 | Munroe | 210/44 |
| 3,418,236 | 12/1968 | Mail | 210/44 |

OTHER PUBLICATIONS

Chem. Abstr., vol. 34, 1185$^3$(1940), vol. 77, 143607d, vol. 82, 174970z, Jun. 1975.
Sienko; M. J., *Chemistry* 2nd ed., McGraw-Hill, N. Y., 1961, pp. 359-363, 422-424, 462.

*Primary Examiner*—Joseph L. Schofer
*Assistant Examiner*—Maria S. Tungol
*Attorney, Agent, or Firm*—Walter M. Rodgers; Walter A. Rodgers

[57] ABSTRACT

Vat and sulfur dyes are recovered from caustic wash water containing oxidized dye by adding ions of aluminum, chromium, ferric iron, lead, or tin and reducing the pH of the wash water to between 6 and 6.8 and separating the precipitate formed for recycling into the dyeing process.

9 Claims, 1 Drawing Figure

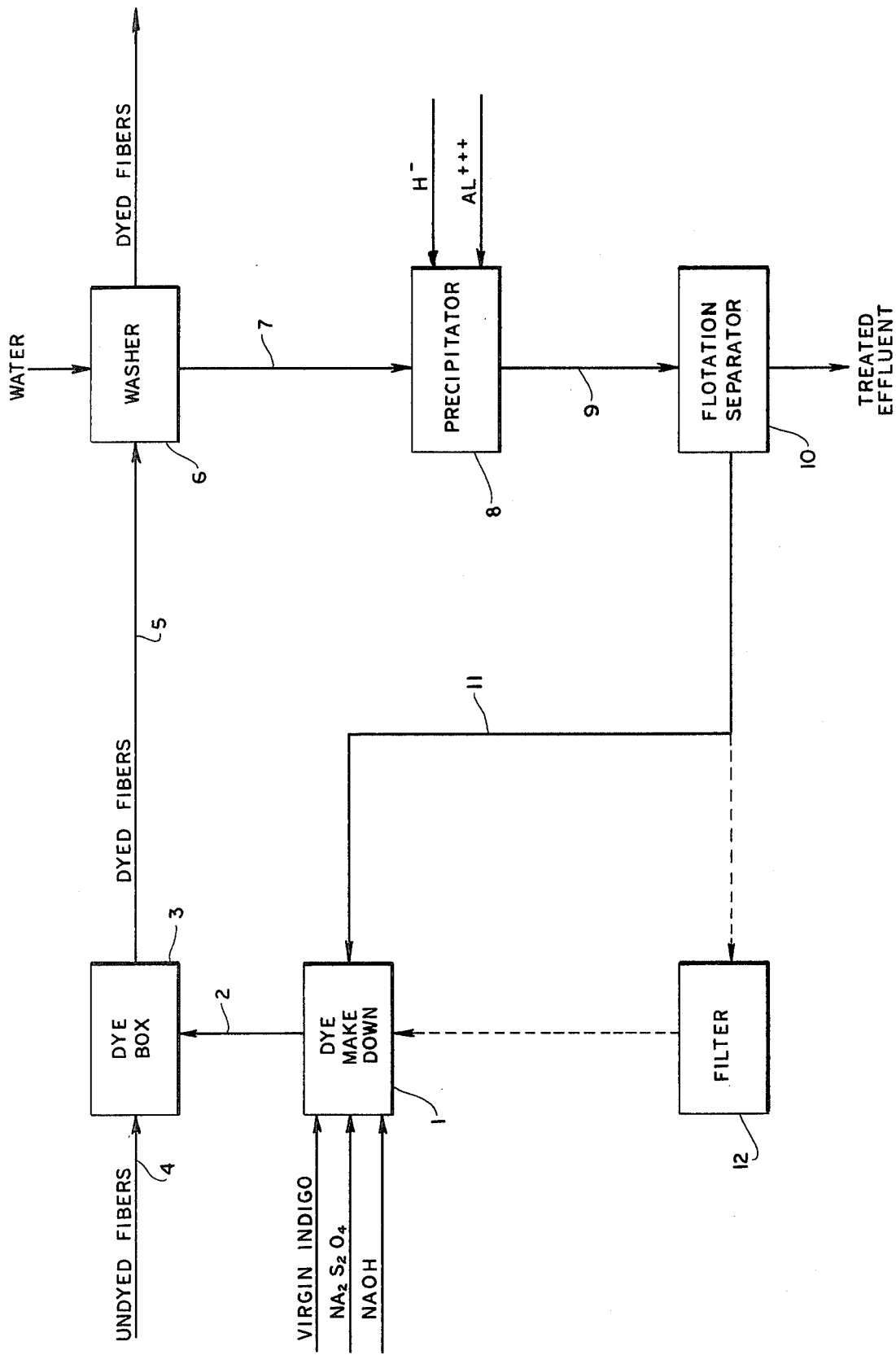

METHOD OF RECOVERING OXIDIZED DYE FROM DYE WASH WATER

This application is a continuation-in-part of applicant's application Ser. No. 639,840, filed Dec. 11, 1975, abandoned, entitled "Process For Recovering A Precipitating Medium."

Applicant has discovered a process for recovering oxidized vat dyes, such as indigo, and sulfur dyes that are not completely trapped by the fibers in the dyeing process. The process will be explained in detail for indigo, but it should be understood that the process is equally useable with any other vat dye or sulfur dye with only conventional adjustments in the dyeing stage being made.

Indigo dyeing is accomplished by placing a caustic solution containing reduced indigo in contact with fibers. The fibers are exposed to air which oxidizes the indigo to a blue insoluble precipitate. The oxidized indigo is mechanically trapped within the latices of the entwined fibers. The fibers are then washed to remove the oxidized indigo that is not fully trapped. In the past the oxidized indigo that was not trapped has been discharged as waste effluent. Not only was a considerable quantity of valuable indigo lost, but it was an unsightly blue pollutant that needed to be treated before being discharged into streams.

Applicant has discovered a process of recovering the untrapped oxidized indigo and recycling it into the dye box. According to the present invention, aluminum ions are added to the discharged wash water from the dyeing process. The pH of the wash water is reduced to between 6 and 6.8 by the addition of acid or electrodialysis, resulting in the precipitation of aluminum hydroxide and indigo, which are separated and recycled into the dye box.

For a better understanding of the invention reference may be had to the following detailed description taken in conjunction with the accompanying drawing which is a schematic block diagram of a system which is particularly well suited for the recovery of indigo dye.

With reference to the FIGURE, the numeral 1 designates the dye make down stage during which conventional practice reduces oxidized indigo to the reduced or leuco form rendering the dye applicable to fiber such as cotton and wool. Oxidized indigo and a suitable reducing agent such as sodium hydrosulfite are added to the water in the dye make down stage. Sodium hydroxide is also added to raise the pH of the solution to approximately 12.5 which is essential for dyeing. The dye solution proceeds from the dye make down stage through the conduit indicated by the numeral 2 to the dye box indicated by the numeral 3.

The dye box 3 receives undyed fibers indicated by the numeral 4, such as cotton or wool, which pass through the dye bath and are dyed and thence exposed to air which oxidizes the indigo. The oxidized indigo is entrapped in the latices of the entwined fibers. The dyed fibers indicated by the numeral 5 are then passed through a washer indicated by the numeral 6 to which water is continuously added. The wash water removes the oxidized indigo that is not fully attached to the fibers along with caustic, sodium aluminate and reduced sulfur compounds (sulfites, thiosulfates and hydrosulfites). The dyed fibers are then removed for further processing into cloth.

Prior to applicant's invention the wash water was simply treated and discharged as waste effluent. Applicant discharges the wash water from the washer 6 into a conduit indicated by the numeral 7 where it proceeds to a precipitator indicated by the numeral 8. The discharge of the wash water is preferably continuous, but can be intermittent.

Sufficient acid, such as sulfuric acid, is added to the wash water in the precipitator 8 to reduce the pH to between 6 and 6.8. The pH can also be reduced by adding hydrogen ions by electrodialysis. Best results are obtained at a pH between 6.3 and 6.6. It may be necessary to add aluminum ions to the wash water to compensate for the aluminum that is carried out on the dyed fibers. It is necessary to have sufficient aluminum present in the precipitator 8 so that an adequate quantity of aluminum hydroxide is formed from a reaction between the aluminum and hydroxyl ions to recover a high percentage of the indigo present. The hydroxyl ions for the reaction may be supplied from the caustic or the wash water itself. A sufficient quantity of aluminum ions in the form of sodium aluminate may be transported by the fibers from the dye box to the wash water. If not, aluminum ions can be added to the wash water in any convenient form such as an ionic aluminum compound that ionizes in a caustic solution such as alum, aluminum sulfate, aluminum chloride or may be added directly as aluminum ions formed by electrolysis. The aluminum must be added before the acid is added or the indigo will not be precipitated with the aluminum hydroxide. The reduction in pH changes the solution to a suspension in which the particles are of colloidal size or larger.

The suspension then proceeds through a conduit indicated by the numeral 9 to the flotation separator indicated by the numeral 10. Flotation of the particles is achieved by supersaturating the suspension with air under pressure. The pressure is then released and the air in the suspension lifts the particles to the surface. The floating particles are then removed by a mechanical skimmer and the waste decolorized effluent discharged. The particles can then be added to the dye make down 1 by any convenient means indicated by the numeral 11. The concentration of the particles can be increased by filtration through a filter indicated by the numeral 12. These particles consist of oxidized indigo and aluminum hydroxide. The caustic nature of the dye make down 1 converts the aluminum hydroxide to sodium aluminate. The oxidized indigo is again converted to its reduced form by a reducing agent. As this is a continuous process, additional indigo dye, sodium hydroxide and hydrogen hydrosulfite must be added to the dye make down 1. A large percentage of the aluminum ions used in the precipitation and separation process are recovered.

The dye recovery process can be used with any vat dye. Examples of such dyes, other than indigo, are the anthraquinone vat dyes. Within such class are the acylaminoanthraquinone vat dyes, such as C.I. Vat Yellow 3, indanthrene vat dyes, such as C.I. Vat Blue 6, anthraquinonecarbazole vat dyes, such as C.I. Vat Yellow 28, and anthraquinoneacridone dyes, such as C.I. Vat Red 38. In addition, this dye recovery process can also be used with the sulfur or sulfide dyes, such as Sulfur Blue 19, Sulfur Black 1, Sulfur Green C.I. 1006 and Sulfur Brown R C.I. 936. The dyeing process has to be varied in accordance with conventional practice, depending on the particular dye used. The dye must be reduced to a water-soluble form in an alkaline solution.

The reduction of the pH in the precipitator 8 to a slightly acid condition converts the sodium aluminate in the solution to aluminum hydroxide. Since the oxidized indigo particles are anionic, they are attracted to and attach themselves to the cationic aluminum hydroxide particles. While aluminum hydroxide is the preferred amphoteric hydroxide, stannous hydroxide, lead hydroxide, ferric hydroxide and chromic hydroxide are also satisfactory. However, ferric hydroxide often interferes with the dyeing process because of its color, but is satisfactory when this does not matter. If chromic, ferric, lead or stannous hydroxide is used, the appropriate ionic compound or metallic ion is added to the precipitator. The hydroxide must be soluble in the caustic dye solution, but readily precipitate in the acid wash solution.

While flotation separation is the preferred method of separation, the metallic hydroxide-dye particles can be separated by other methods such as high pressure filtration. However, high pressure filtration requires more energy than the flotation separation.

When the metallic hydroxide separated is added to the dye make down, its amphoteric properties result in it being converted to a sodium metallic salt (e.g., sodium chromite, sodium stannite, sodium aluminate) due to the high alkalinity and caustic nature of the dye make down.

Thus, applicant has developed a process of recovering dye and metallic hydroxide from dye wash waters. This process is also designed to be operated on a continuous basis. The recovery process is usually only economical with long production runs of a continuous process. While the process can be used with mixtures of dyes, it is often not practical to do so with a mixture of more than two dyes.

The embodiments of the invention in which an exclusive property or privilege is claimed are defined as follows:

1. In a process for the dyeing of fibers in a caustic dye bath of high alkalinity with a dye selected from the group consisting of vat dyes and sulfur dyes whereby a reducing agent is employed to reduce the dye to its reduced form in the bath, undyed fibers are passed through said bath and the dye is subsequently oxidized upon the fibers and the fibers are washed with water to remove the oxidized dye and caustic that is not firmly entrapped in the fibers, which comprises the recovery of the oxidized dye that is removed by washing the fibers by first adding to the water in which the fibers have been washed a metallic precipitating ingredient selected from the group consisting of elemental aluminum, tin, ferric iron, chromium, lead and compounds thereof that ionize in a caustic solution, said wash water containing a source of hydroxyl ions, and reducing the pH of the wash water to between 6 and 6.8 so that a precipitate of the dye and the reaction product of the metallic ion in the precipitating ingredient and hydroxyl ions in the wash water is formed and separating the precipitate from the water and supplying the precipitate and additional dye selected from the group consisting of vat dyes and sulfur dyes to the caustic dye bath for recycling in the dyeing process.

2. The process of claim 1 in which the precipitate is removed by flotation separation.

3. The process of claim 2 in which the precipitate is filtered after flotation separation.

4. The process of claim 2 in which the dye is a vat dye.

5. The process of claim 4 in which the vat dye is indigo.

6. The process of claim 5 in which the precipitating ingredient is elemental aluminum.

7. The process of claim 5 in which the pH of the water is reduced to between 6.3 and 6.6.

8. The process of claim 5 in which the precipitating ingredient is alum.

9. The process of claim 8 in which the pH of the water is reduced to between 6.3 and 6.6.

* * * * *